United States Patent
Ku

(10) Patent No.: US 9,424,582 B2
(45) Date of Patent: Aug. 23, 2016

(54) SYSTEM AND METHOD FOR MANAGING CUSTOMER ADDRESS INFORMATION IN ELECTRONIC COMMERCE USING THE INTERNET

(75) Inventor: Young Bae Ku, Seocho-Gu (KR)

(73) Assignee: eBay Inc., San Jose, CA (US)

( * ) Notice: Subject to any disclaimer, the term of this patent is extended or adjusted under 35 U.S.C. 154(b) by 414 days.

(21) Appl. No.: 12/483,373

(22) Filed: Jun. 12, 2009

(65) Prior Publication Data

US 2010/0030811 A1    Feb. 4, 2010

(30) Foreign Application Priority Data

Jul. 29, 2008    (KR) .................. 10-2008-0074201

(51) Int. Cl.
G06Q 10/00    (2012.01)
G06Q 30/02    (2012.01)
G06Q 30/06    (2012.01)

(52) U.S. Cl.
CPC .............. G06Q 30/02 (2013.01); G06Q 30/06 (2013.01)

(58) Field of Classification Search
CPC ... G06Q 30/00; G06Q 30/02; G06Q 30/0205; G06Q 30/06; G06Q 30/0601
See application file for complete search history.

(56) References Cited

U.S. PATENT DOCUMENTS

| 7,373,672 B2* | 5/2008 | Un ................................ 726/31 |
| 7,937,579 B2* | 5/2011 | Peckover ...................... 713/151 |
| 2001/0027439 A1* | 10/2001 | Holtzman et al. .............. 705/39 |
| 2003/0216974 A1* | 11/2003 | Browne ................ G06F 19/327 705/28 |
| 2007/0152041 A1* | 7/2007 | Hawkins ....................... 235/383 |
| 2009/0193026 A1* | 7/2009 | Andersson et al. .............. 707/9 |
| 2009/0240620 A1* | 9/2009 | Kendrick ............... G06Q 20/12 705/39 |
| 2011/0173676 A1* | 7/2011 | Peckover ......................... 726/3 |

FOREIGN PATENT DOCUMENTS

| CN | 1452740 | 10/2003 |
| JP | 2000330963 | 11/2000 |
| JP | 2002007346 | 1/2002 |
| JP | 2002099964 | 5/2002 |
| JP | 2003076932 | 3/2003 |
| JP | 2005071054 | 3/2005 |
| JP | 2006018595 | 1/2006 |
| JP | 2006236066 A | 9/2006 |
| JP | 2007280261 | 10/2007 |

(Continued)

OTHER PUBLICATIONS

Johansson, Jesper; Anatomy of a Hack: How a Criminal Might Infiltrate Your Network, 2005, Technet Magazine, pp. 1-14.*

(Continued)

*Primary Examiner* — Allen J Jung
(74) *Attorney, Agent, or Firm* — Schwegman, Lundberg & Woessner, P.A.

(57) ABSTRACT

A system and method for managing customer address information in electronic commerce using the Internet are provided. Customers' detailed address information is received from customer terminals connected over the Internet, a unique address number corresponding to the detailed address information is produced, and the produced unique address number and the corresponding detailed address information are separately stored and managed in separate database (DBs), thereby effectively preventing leakage of the customers' detailed address information due to hacking or a malicious program.

12 Claims, 3 Drawing Sheets

(56) References Cited

FOREIGN PATENT DOCUMENTS

JP        201033558 A    2/2010
KR      1020080068035    7/2009

OTHER PUBLICATIONS

Chong, Frederick et al., Multi-Tenant Data Architecture, Jun. 2006, Microsoft Corporation, pp. 1-26.*
Chinese Patent Application No. CN 200910150798.7, Office Action dated Jan. 18, 2012. 11 pages.
Japanese Patent Application No. 2009-150289, Decision of Rejection dated Jun. 8, 2012. 3 pages.
Japanese Patent Application No. 2009-150289, Statement of Relevance regarding cited reference entitled "Aiming to SOHO-Expert", 11 pages.
"Chinese Application Serial No. 200910150798.7, Office Action mailed Apr. 14, 2011", with English translation of claims, 6 pgs.
"Chinese Application Serial No. 200910150798.7, Office Action mailed Sep. 24, 2012", with English translation of claims, 15 pgs.
"Chinese Application Serial No. 200910150798.7, Response filed Jan. 9, 2013", with English machine translation, 17 pgs.
"Chinese Application Serial No. 200910150798.7, Response filed Apr. 25, 2012", with English machine translation, 9 pgs.
"Chinese Application Serial No. 200910150798.7, Response filed Jul. 22, 2011", with English machine translation, 10 pgs.
"Japanese Application Serial No. 2009-150289, Amendment for Appeal filed Nov. 26, 2012", with English machine translation, 13 pgs.
"Japanese Application Serial No. 2009-150289, Examiners Decision of Final Refusal filed Jun. 18, 2012", with English machine translation, 23 pgs.
"Japanese Application Serial No. 2009-150289, Office Action mailed Apr. 7. 2014", with English machine translation, 21 pgs.
"Japanese Application Serial No. 2009-150289, Office Action mailed Jun. 12, 2013", with Foreign Associate's translation, 7 pgs.
"Japanese Application Serial No. 2009-150289, Office Action mailed Jul. 4, 2011", with English translation of claims, 7 pgs.
"Japanese Application Serial No. 2009-150289, Response filed Sep. 11, 2013", with English translation of claims, 14 pgs.
"Japanese Application Serial No. 2009-150289, Response filed Nov. 4, 2011", with English machine translation, 29 pgs.
SOHO, "Aiming to SOHO", Windows NT World vol. 4 No. 9 with English machine translation, (Sep. 1, 1999), 20 pgs.

\* cited by examiner

FIG. 2

| Address number | Address name | Country code | Do/Ju/Hyun | Si/Gun/Gu | Dong/Eup/Myeon | Detailed address | Zip code | Front address | Rear address | | |
|---|---|---|---|---|---|---|---|---|---|---|---|
| 12345 | Company address | | | Seoul/Kangnam-gu | Yeoksam-dong | 649-11, Floors 6-9, LIG Tower | 135-912 | Yeoksam-dong, Kangnam-gu, Seoul | 649-11, Floors 6-9, LIG Tower | | |
| 67890 | | | | | | | | | | | |
| ••• | ••• | ••• | ••• | ••• | ••• | ••• | ••• | ••• | ••• | | |
| ••• | ••• | ••• | ••• | ••• | ••• | ••• | ••• | ••• | ••• | | |

| Address | Registration channel | Register ID | Registration date | Modification channel | Modifier ID | Modification date | Customer name | Customer telephone number |
|---|---|---|---|---|---|---|---|---|
| 649-11, Floors 6-9, LIG Tower, Yeoksam-dong, Kangnam-gu, Seoul | Destination address | gmarket 01 | 2000.11.23 | Destination address | gmarket 34 | 2005.12.21 | Gmarket | 02-3016-**** |
| ••• | ••• | ••• | ••• | ••• | ••• | ••• | ••• | ••• |
| ••• | ••• | ••• | ••• | ••• | ••• | ••• | ••• | ••• |

SYSTEM AND METHOD FOR MANAGING CUSTOMER ADDRESS INFORMATION IN ELECTRONIC COMMERCE USING THE INTERNET

CROSS-REFERENCE TO RELATED APPLICATION

This application claims priority to and the benefit of Korean Patent Application No. 2008-0074201, filed on Jul. 29, 2008, the disclosure of which is incorporated herein by reference in its entirety.

BACKGROUND

1. Field of the Invention

The present invention relates to a system and method for providing electronic commerce using the Internet, and more particularly, to a system and method for managing customer address information in electronic commerce using the Internet that are capable of effectively preventing leakage of customers' detailed address information due to hacking or a malicious program by receiving the customers' detailed address information from customer terminals connected over the Internet, producing a corresponding unique address number, and separately storing and managing the produced unique address number and the corresponding detailed address information in separate databases (DBs).

2. Discussion of Related Art

Recently, rapid development of the Internet has led to increased electronic commerce in which goods are purchased online. The electronic commerce involves a variety of goods, including daily-use products, household goods, electronic products, etc.

The electronic commerce has been developed with enhanced communication networks, and in particular, provides sellers and buyers with other benefits not provided by traditional commerce systems.

The electronic commerce allows sellers not to have a separate large warehouse for storing goods, which reduces facility budget and accordingly prices of products.

Meanwhile, not only can buyers shop more conveniently, rather than visiting a store, but goods can also be purchased at lower prices.

In online shopping mall websites for electronic commerce, customers input their personal information in a web browser for goods delivery, service performance, and payment in purchasing goods or services on the Internet.

The customers' input personal information is encrypted using an encryption scheme and sent to a credit-card payment company or a credit-card payment bank.

Also, detailed information, such as purchase content, addresses, customers' (sellers' or buyers') telephone numbers, is sent to a server of a shopping mall website for electronic commerce over the Internet. When customers subscribe as members, the customers' personal information is stored in a customer database (DB) of the server.

In most shopping mall sites, a customer's personal information that is recorded and sent on the web browser of the customer terminal when the customer subscribes as a member generally includes, for example, an ID, a password, a name, an address, a telephone number, a social security number, as required inputs, and may also include a company name, a position in a company, a cellular phone number, hobbies, etc.

As described above, the customer stores his or her personal information in a customer DB interworking with a server of an electronic commerce website after subscribing as a member, such that when the customer desires to purchase or sell goods or services on the Internet, the customer's personal information is output on a web browser of a customer terminal for the customer's convenience.

Accordingly, a customer only needs to record types and numbers of goods, and not his or her personal information.

However, when the customer DB of the electronic commerce website is hacked by a hacker due to its poor security, that is, when the customer DB is hacked once, customers' personal information, i.e., important information such as an address, a social security number, or a credit card number will be exposed in a defenseless state.

Accordingly, since a broker for performing electronic commerce with customers may be seriously damaged, both sellers and buyers dislike storing their personal information in the server.

SUMMARY OF THE INVENTION

The present invention is directed to a system and method for managing customer address information in electronic commerce using the Internet that are capable of effectively preventing leakage of customers' detailed address information due to hacking or a malicious program by receiving the customers' detailed address information from customer terminals connected over the Internet, producing a corresponding unique address number, and separately storing and managing the produced unique address number and the corresponding detailed address information in separate databases (DBs).

According to an aspect of the present invention, there is provided a system for managing customer address information in electronic commerce using the Internet, the system comprising: a customer address database (DB) for storing a unique address number for each customer; an integrated address DB for storing detailed address information corresponding to the unique address number for each customer, in an integrated manner; and a management server for receiving the customers' detailed address information from customer terminals connected over the Internet, producing the unique address number for each customer corresponding to the detailed address information, storing the produced unique address number for each customer in the customer address DB, and storing the detailed address information corresponding to the unique address number for each customer in the integrated address DB.

The management server may include: a first server for receiving the customers' detailed address information from the customer terminals connected over the Internet, producing the unique address number for each customer corresponding to the detailed address information, and storing the produced unique address number for each customer in the customer address DB; and a second server for receiving the detailed address information corresponding to the produced unique address number for each customer from the first server and storing the detailed address information in the integrated address DB.

The management server may be connected to the customer address DB and the integrated address DB through different administrator accounts.

The customer address DB may include: a seller address DB for storing a unique address number for each seller; and a buyer address DB for storing a unique address number for each buyer, wherein the seller address DB is included in the buyer address DB.

The management server may produce one unique address number for the same ones among the customers' detailed address information input from the customer terminal, store the produced unique address number in the customer address DB, and store the detailed address information corresponding to the unique address number in the integrated address DB.

The management server may temporarily store the customers' detailed address information in a separate temporary table when the management server is not normally connected with the integrated address DB for communication, and store the customers' detailed address information in the integrated address DB when the management server is normally connected with the integrated address DB.

The system may further include a backup integrated address DB interworking with the integrated address DB for synchronizing and backing up the customers' detailed address information for each unique address number stored in the integrated address DB, wherein when the integrated address DB does not normally operate, the management server is connected to the backup integrated address DB.

According to another aspect of the present invention, there is provided a method for managing customer address information in electronic commerce using the Internet in an electronic commerce method for brokering online transactions between customers in an online shopping mall comprising a management server operating the online shopping mall and customer terminals connected over the Internet, the method comprising: (a) receiving customers' detailed address information from customer terminals and producing a unique address number for each customer corresponding to the detailed address information; (b) storing the produced unique address number for each customer in a separate customer address DB; and (c) storing the detailed address information corresponding to the unique address number for each customer in a separate integrated address DB.

Step (a) may further include producing one unique address number for the same ones among the customers' detailed address information input from the customer terminals, storing the produced unique address number in the customer address DB, and storing the detailed address information corresponding to the unique address number in the integrated address DB.

Step (c) may further include temporarily storing the customers' detailed address information in a separate temporary table when communication is not normally made with the integrated address DB, and storing the customers' detailed address information in the integrated address DB when the communication is normally made with the integrated address DB.

The method may further includes connecting to a backup integrated address DB interworking with the integrated address DB for synchronizing and backing up the customers' detailed address information for each unique address number stored in the integrated address DB when the integrated address DB does not normally operate.

According to still another aspect of the present invention, there is provided a computer-readable recording medium having a computer-executable program recorded thereon for executing a method for managing customer address information in electronic commerce using the Internet.

With the system and method for managing customer address information in electronic commerce using the Internet according to the present invention, customers' detailed address information is received from customer terminals connected over the Internet, a unique address number corresponding to the detailed address information is produced, and the produced unique address number and the corresponding detailed address information are separately stored and managed in separate DBs, thereby effectively preventing leakage of the customers' detailed address information due to hacking or a malicious program.

Even when a hacker intrudes into the customer address DB of an online shopping mall website, he or she cannot obtain complete detailed address information of customers since only a unique address number for each customer is stored in the customer address DB. Thus, the hacker cannot misuse the customers' detailed address information, and safety of the customers' detailed address information can be thereby effectively guaranteed.

Also, one unique address number is produced for the same ones among the customers' detailed address information, and the produced unique address number and the corresponding detailed address information are separately stored and managed in separate DBs, thereby reducing an amount of customer information data in the DBs, efficiently operating and managing the DBs, and building the DBs at low cost.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 illustrates a structure of detailed address information for a unique address number stored in an integrated address DB according to an exemplary embodiment of the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
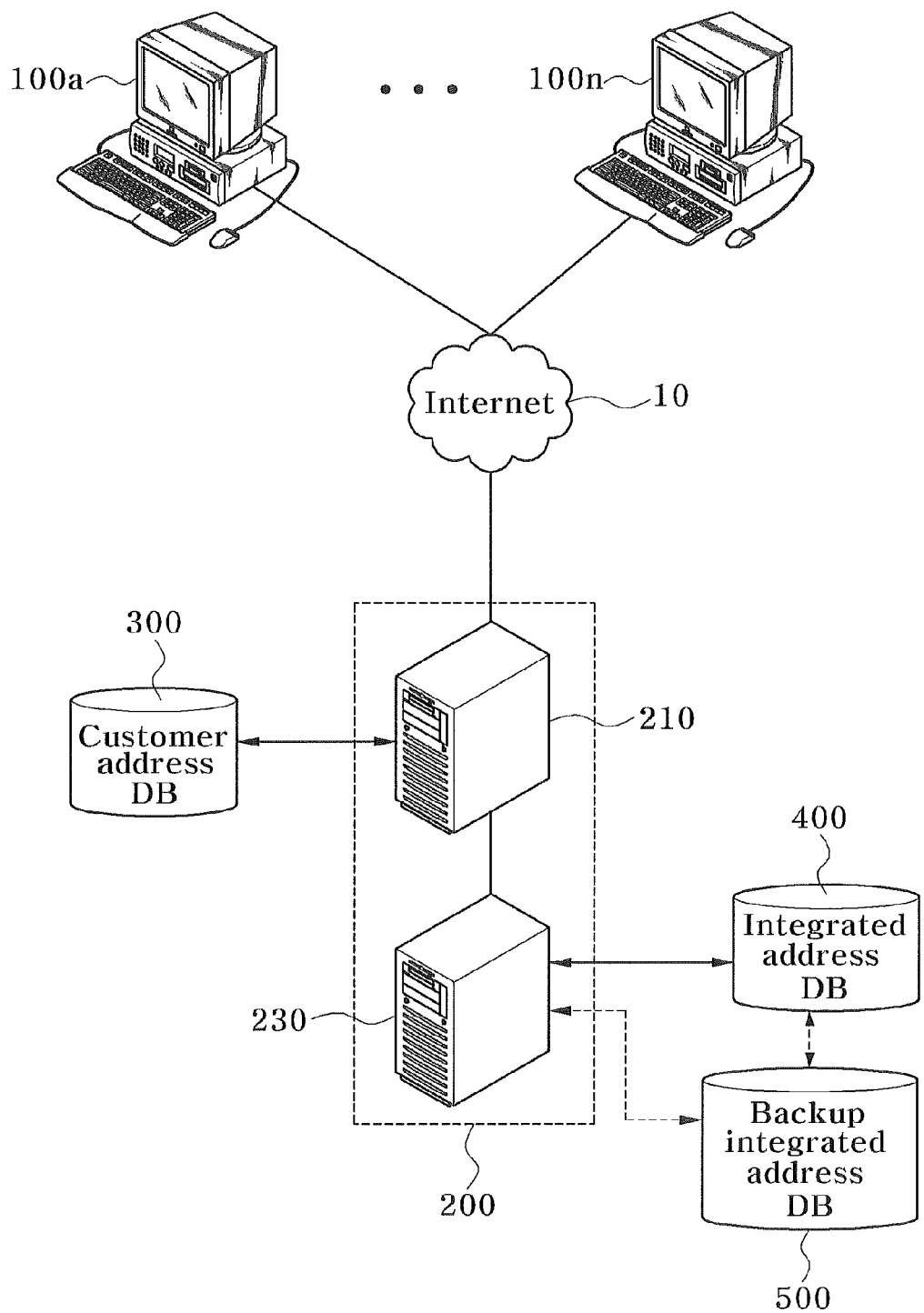
FIG. 1 is a block diagram illustrating a system for managing customer address information in electronic commerce using the Internet according to an exemplary embodiment of the present invention.

FIG. 1 is a block diagram illustrating a system for managing customer address information in electronic commerce using the Internet according to an exemplary embodiment of the present invention, and FIG. 2 illustrates a structure of detailed address information for a unique address number stored in an integrated address DB according to an exemplary embodiment of the present invention.

Referring to FIG. 1, a system for managing customer address information in electronic commerce using the Internet according to an exemplary embodiment of the present invention includes a plurality of customer terminals 100a to 100n, a management server 200, a customer address database (DB) 300, and an integrated address DB 400.

The customer terminals 100a to 100n are buyer or seller terminals connected to the management server 200 over the Internet 10.

The Internet 10 is a global open computer network structure that provides TCP/IP protocol, and several services present on an upper layer, such as Hyper Text Transfer Protocol (HTTP), Telnet, File Transfer Protocol (FTP), Domain Name System (DNS), Simple Mail Transfer Protocol (SMTP), Simple Network Management Protocol (SNMP), Network File Service (NFS), and Network Information Service (NIS). The Internet 10 provides an environment for enabling any customer (a buyer or a seller) of the customer terminals 100a to 100n to easily access the management server 200, which will be described below. Meanwhile, the Internet 10 may be wired or wireless Internet. Alternatively, the Internet 10 may be a core network integrated with a wired public network, a wireless mobile network, or mobile Internet.

Meanwhile, the customer terminals 100a to 100n are generally computers, such as desktop personal computers (PCs) or notebook PCs, but are not limited thereto. For example, the customer terminals 100a to 100n may be any kind of wired or wireless communication devices that can use bidirectional electronic commerce service by accessing the management server 200 over the Internet 10.

For example, the customer terminals 100a to 100n may be mobile terminals such as cellular phones, Personal Communications Services (PCS) phones, and synchronous/asynchronous International Mobile Telecommunication (IMT)-2000 terminals that are in communication via wireless or mobile Internet. Alternatively, the customer terminals 100a to 100n may be any wired or wireless customer electronics/communication devices having a user interface for accessing the management server 200, such as palm PCs, Personal Digital Assistants (PDAs), smart phones, Wireless Application Protocol (WAP) phones, and mobile game machines that operate online shopping malls.

The customer terminals 100a to 100n may access the management server 200 over the Internet 10, and use transaction brokerage service for goods or services provided by the management server 200 via wired or wireless communication made by the communication interface. The customer (a buyer or a seller) may subscribe to the service provided by the management server 200 using the customer terminals 100a to 100n, and a variety of customer information registered by the customer may be stored in a customer DB (not shown).

Meanwhile, in the case of the seller, the customer terminals 100a to 100n may access the web server of the management server 200 (not shown) to subscribe as a member, and register goods and seller information including seller address information through a downloaded and installed seller management program (e.g., a Gmarket GSM program; not shown).

The management server 200 is a service management server for operating an online shopping mall, and particularly, receives customers' detailed address information (e.g., home addresses, company addresses, destination addresses, etc.) from the customer terminals 100a to 100n connected over the Internet 10 and produces a corresponding unique address number for each customer.

The management server 200 also stores the produced unique address number for each customer in the customer address DB 300, and stores the detailed address information corresponding to the unique address number for each customer in the integrated address DB 400.

The management server 200 includes a first server 210 for receiving the customers' detailed address information from the customer terminals 100a to 100n connected over the Internet 10, producing a unique address number for each customer corresponding to the detailed address information, and storing the produced unique address number for each customer in the customer address DB 300; and a second server 210 connected to the first server 21 for storing the detailed address information corresponding to the unique address number for each customer produced by the first server 210 in the integrated address DB 400.

That is, the first server 210 is used as a service management server for operating the online shopping mall, sends the detailed address information corresponding to the produced unique address number for each customer to the second server 230 and stores the produced unique address number for each customer in the customer address DB 300. The second server 230 receives the detailed address information corresponding to the produced unique address number for each customer from the first server 210, and stores the detailed address information in the integrated address DB 400.

Meanwhile, although not shown, firewalls for hacking protection may be provided at an input of the first server 210 and between the first and second server 210 and 230.

The management server 200 is also connected to the customer address DB 300 and the integrated address DB 400 through different administrator accounts, such that a hacker must attempt to hack twice. This can effectively prevent leakage of the customers' detailed address information due to hacking or a malicious program.

When there are the same ones among the customers' detailed address information input from the customer terminals 100a to 100n, e.g., when a customer's home address is the same as a destination address, the management server 200 produces one unique address number and stores the produced unique address number in the customer address DB 300.

The management server 200 stores the detailed address information corresponding to the unique address number in the integrated address DB 400, such that an amount of customer information data in the databases, i.e., the customer address DB 300 and the integrated address DB 400 can be greatly reduced, the databases can be efficiently operated and managed, and the databases can be built at low cost.

Upon receipt of a request for a customer's detailed address information stored in the integrated address DB 400 from the customer terminals 100a to 100n, the management server 200 searches for a unique address number corresponding to the requesting customer from the customer address DB 300, extracts detailed address information corresponding to the searched unique address number from the integrated address DB 400, and sends the detailed address information to the customer terminals 100a to 100n.

When the management server 200 is not normally connected with the integrated address DB 400 for communication, that is, when the first server 210 is disconnected from the second server 230, the management server 200 temporarily stores the customer's detailed address information in a separate temporary table.

When the communication is normally made between the first server 210 and the second server 230, the customer's detailed address information temporarily stored in the temporary table may be stored in the integrated address DB 400.

Meanwhile, in one exemplary embodiment of the present invention, the management server 200 has been implemented by the first and second servers 210 and 230 but the present invention is not limited thereto. The first and second servers 210 and 230 may be implemented as one integrated management server 200.

In this case, the integrated management server 200 receives the customers' detailed address information from the customer terminals 100a to 100n connected over the Internet 10, produces a unique address number for each customer corresponding to the detailed address information, and stores the produced unique address number for each customer and the corresponding detailed address information in the customer address DB 300 and the integrated address DB 400, respectively.

Although not shown, a web server is included in the management server 200 or provided separately for connecting the customer terminals 100a to 100n with the management server 200 over the Internet 10 and providing various web services of the management server 200, which operates the online shopping mall, through a specific web page.

The customer address DB 300 stores only the produced unique address number for each customer from the management server 200, and the integrated address DB 400 stores the customer's detailed address information corresponding to the produced unique address number for each customer from the management server 200, in an integrated manner.

The customer address DB 300 may be implemented to store the unique address number for each ID of subscribed customers. Also, when a customer in the customer address DB 300 accesses the web server of the management server 200 and subscribes as a member, the ID of the subscribed customer may be basically registered for a buyer, or may be registered for a seller by selection of the customer.

That is, the seller address DB for storing a unique address number for each seller is included in the buyer address DB for storing a unique address number for each buyer. In this case, the customer ID may be basically registered for a buyer or may be registered for a seller.

In this manner, for example, the customer address DB 300 may basically store a buyer address for each customer ID, and store other addresses, such as a seller address and a destination address.

The customer address DB 300 stores only the unique address numbers. Thus, even when buyer addresses, destination addresses, and the like overlap, detailed address information need not be stored several times.

For a family having the same detailed address information and different IDs, it is unnecessary to record the detailed address information in an overlapping manner and it is possible to use the unique address number, such that problems caused by overlapping address recordation (such as excessive data and security vulnerability) can be solved.

However, the customer address DB 300 is not limited to this method.

Customer IDs may be separately registered as buyer IDs and seller IDs, if necessary.

When the seller address DB and the buyer address DB are separately registered, the seller address DB and the buyer address DB may store at least one unique address number corresponding to the seller ID and the buyer ID, respectively.

That is, the seller address DB and the buyer address DB store a unique address number for each of the seller IDs and buyer IDs. Thus, it is unnecessary to record the detailed addresses in an overlapping manner, as described above.

Meanwhile, as shown in FIG. 2, the customers' detailed address information stored in the integrated address DB 400 is in a table form including, for example, an address number, an address name (consisting of about 20 words, such as "a parent address" or "a company address"), a country code, a first address field (Do/Ju/Hyun), a second address field (Si/Gun/IKu), a third address field (Dong/Eup/Myeon), a fourth address field (detailed address), and a zip code.

Additionally, for example, a front address, a rear address, an address, a registration channel (i.e., an address for each address registering case, such as a destination address), a Register ID, a registration date, a modification channel (i.e., an address for each address modifying case, such as a destination address), a modifier ID, a modification date, a customer name, a customer telephone number, etc. may be included in the table.

The system may further include a backup integrated address DB 500 interworking with the integrated address DB 400 for synchronizing and backing up the customers' detailed address information for each unique address number stored in the integrated address DB 400. In this case, the management server 200 may be connected to the backup integrated address DB 500 when the integrated address DB 400 does not normally operate.

A method for managing customer address information in electronic commerce using the Internet according to an exemplary embodiment of the present invention will be described in detail.

Figure 3:
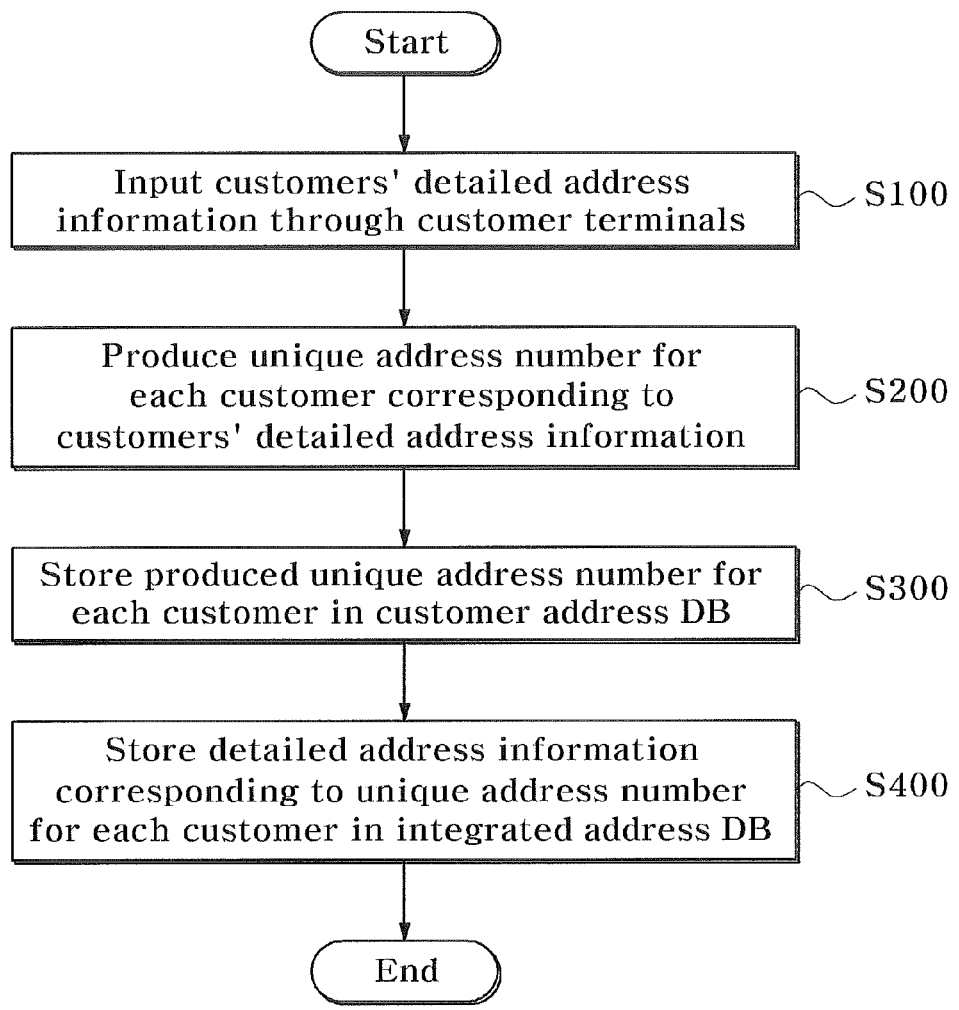
FIG. 3 is a flowchart illustrating a method for managing customer address information in electronic commerce using the Internet according to an exemplary embodiment of the present invention.

FIG. 3 is a flowchart illustrating a method for managing customer address information in electronic commerce using the Internet according to an exemplary embodiment of the present invention. Unless mentioned otherwise, the management server 200 performs the method.

Referring to FIGS. 1 to 3, after accessing the management server 200 connected to the Internet 10 through one of the customer terminals 100a to 100n, the customer (a seller or a buyer) inputs detailed address information according to several situations (e.g., member subscription/modification, delivery, order, etc.) (S100).

The management server 200 then receives customers' detailed address information from the customer terminals 100a to 100n, produces a corresponding unique address number for each customer (a seller or a buyer) (S200), stores the produced unique address number for each customer in the customer address DB 300 (S300), and stores the detailed address information corresponding to the unique address number for each customer in the integrated address DB 400 (S400).

Meanwhile, a process of producing a unique address number for each customer will be described in detail. First, the management server 200 receives a customer's detailed address information from the customer terminals 100a to 100n, checks if the customer's ID is in the customer address DB 300, confirms all unique address numbers corresponding to the customer's ID when the customer's ID is in the customer address DB 300, and extracts detailed address information corresponding to all the unique address numbers from the integrated address DB 400.

If there is the same detailed address information in the customer's detailed address information input from the customer terminals 100a to 100n and the extracted detailed address information, the management server 200 uses a previously stored unique address number, instead of producing a new unique address number.

If there is no same detailed address information in the customers' detailed address information input from the customer terminals 100a to 100n and the extracted detailed address information, the management server 200 produces a new unique address number, stores the produced unique address number in the customer address DB 300, and stores detailed address information corresponding to the produced unique address number in the integrated address DB 400.

Meanwhile, when the customer's ID is not in the customer address DB 300, the management server 200 produces a unique address number corresponding to the customer's ID, stores the produced unique address number in the customer address DB 300 together with the customer's ID, and stores the corresponding detailed address information together with the produced unique address number in the integrated address DB 400.

Additionally, in step S400, when the management server 200 is not normally connected with the integrated address DB 400 for communication, the management server 200 temporarily stores the detailed address information corresponding to the unique address number for each customer in a separate temporary table, and then stores the customers' detailed address information in the integrated address DB 400 when the management server 200 is normally connected with the integrated address DB 400.

Following step S400, when a customer's detailed address information stored in the integrated address DB 400 is requested from one of the customer terminals 100a to 100n, the management server 200 may search for a unique address number corresponding to the customer from the customer address DB 300, extract the detailed address information corresponding to the searched unique address number from the integrated address DB 400, and transmit the detailed address information to the one of the customer terminals 100a to 100n.

When the integrated address DB 400 does not normally operate, the management server 200 may enable a connection to a backup integrated address DB 500 interworking the integrated address DB 400 for synchronizing and backing up the customer's detailed address information for each unique address number stored in the integrated address DB 400.

Meanwhile, the method for managing customer address information in electronic commerce using the Internet according to an exemplary embodiment of the present invention may be implemented as computer-readable code on a computer-readable recording medium. The computer-readable recording medium may include any of all kinds of recording devices that store computer-readable data.

Examples of the computer-readable recording medium include a read-only memory (ROM), a random access memory (RAM), a compact disk-read only memory (CD-ROM), a magnetic tape, a floppy disk, and optical data storage. Another example of the medium is carrier waves (e.g., Internet transmission).

Further, the computer-readable recording medium may be distributed over networked computer systems so that the computer-readable code can be stored and executed in a de-centralized manner.

Meanwhile, the unique address number stored for each customer in the customer address DB may be changed by periods for security.

While the invention has been shown and described with reference to certain exemplary embodiments thereof, it will be understood by those skilled in the art that various changes in form and details may be made therein without departing from the spirit and scope of the invention as defined by the appended claims.

For example, although the present invention has been implemented with reference to the detailed address information among the customers' personal information of in one exemplary embodiment of the present invention, the present invention is not limited thereto. The present invention may be applied to any important personal information of customers (e.g., a social security number, a credit card number, a telephone number, a member ID, a password, etc.).

What is claimed is:

1. A system for managing customer address information in electronic commerce using a computer network, the system comprising:
    a customer address database (DB) for storing a unique address number for each customer, the customer address DB comprising:
        a seller address DB for storing a unique address number for each seller, and
        a buyer address DB for storing a unique address number for each buyer, the seller address DB being included in the buyer address DB;
    an integrated address DB for storing address information corresponding to the unique address number for each customer, in an integrated manner; and
    a management server configured to protect a leakage of customer address information through the computer network, the management server comprising a first physical server having a first processor and a second physical server having a second processor, the first processor of the first physical server being configured to receive the customer address information from a plurality of customer terminals coupled over the computer network, and the first processor of the first physical server being configured to produce the unique address number for each customer corresponding to the customer address information, and the first processor of the first physical server being configured to store the produced unique address number for each customer in the customer address DB, and the second processor of the second physical server being configured to store the customer address information corresponding to the unique address number for each customer in the integrated address DB, the customer address DB being configured to store the unique address number only once for the customer address information such that the unique address number is extractable each time the customer address information is input from the customer terminal, the management server being coupled to the customer address DB and the integrated address DB through different administrator accounts, and the management server is further configured to temporarily store the customer address information in a separate temporary table in response to the management server not being connected over a computer internet network with the integrated address DB for communication, and to store the customer address information, taken from the separate temporary table, in the integrated address DB in response to the management server being connected over the computer internet network with the integrated address DB for communication.

2. The system of claim 1, wherein the management server is configured to extract the unique address number each time the address information is input by a customer at one of the customer terminals.

3. The system of claim 1, wherein the customer is a seller or a buyer subscribing as a member through a web server of the management server.

4. The system of claim 1, further comprising a backup integrated address DB interworking with the integrated address DB for synchronizing and backing up the customers address information for each unique address number stored in the integrated address DB, wherein:
    based on the integrated address DB not operating, the management server is connected to the backup integrated address DB.

5. The system of claim 1, wherein the customer address DB stores only the unique address numbers.

6. A computer-implemented method for managing customer address information in electronic commerce using a computer network, the method comprising:
    (a) receiving, using a computer system, customers' address information from customer terminals and producing a unique address number for each customer corresponding to the address information;
(b) storing, using a computer system, the produced unique address number for each customer in a customer address DB coupled to a first physical server of the computer system, the customer address DB comprising:
  a seller address DB for storing a unique address number for each seller; and
  a buyer address DB for storing a unique address number, for each buyer, the seller address DB being included in the buyer address DB;
(c) storing, using a computer system, the address information corresponding to the unique address number for each customer in an integrated address DB coupled to a second physical server of the computer system, the integrated address DB being separate from the customer address DB, the first and second physical servers being coupled to the customer address DB and the integrated address DB through different administrator accounts, the customers' address information being stored in a separate temporary table in response to a management server not being connected over a computer internet network with the integrated address DB for communication, and the customers' address information being stored, taken from the separate temporary table, in the integrated address DB in response to the management server being connected over the computer internet network with the integrated address DB for communication; and
(d) storing, using a computer system, the unique address number only once for the customers' address information such that the unique address number is extractable each time the customer's address information is input from a customer terminal.

7. The computer-implemented method of claim 6, wherein step (a) further comprises producing one unique address number for the same ones among the customers' address information input from the customer terminals.

8. The computer-implemented method of claim 7, further comprising storing, using the computer system, the produced unique address number in the customer address DB and storing the address information corresponding to the unique address number in the integrated address DB.

9. The computer-implemented method of claim 6, further comprising connecting, using the computer system, to a backup integrated address DB interworking with the integrated address DB for synchronizing and backing up the customers' address information for each unique address number stored in the integrated address DB when the integrated address DB does not operate.

10. The computer-implemented method of claim 6, wherein the customer address DB stores only the unique address numbers.

11. A computing system comprising a processor coupled to a computer-readable memory unit, said memory unit comprising a software application, said software application comprising instructions that when executed by said processor implement operations comprising:

(a) receiving, using a computer system, customer address information from customer terminals and producing a unique address number for each customer corresponding to the address information;
(b) storing, using a computer system, the produced unique address number for each customer in a customer address DB coupled to a first physical server of the computer system, the customer address DB comprising:
  a seller address DB for storing a unique address number for each seller; and
  a buyer address DB for storing a unique address number for each buyer, the seller address DB being included in the buyer address DB;
(c) storing, using a computer system, the address information corresponding to the unique address number for each customer in an integrated address DB coupled to a second physical server of the computer system, the integrated address DB being separate from the customer address DB, the first and second physical servers being coupled to the customer address DB and the integrated address DB through different administrator accounts, the customers' address information being stored in a separate temporary table in response to a management server not being connected over a computer internet network with the integrated address DB for communication, and the customers' address information, taken from the separate temporary table, being stored in the integrated address DB in response to the management server being connected over the computer internet network with the integrated address DB for communication; and
(d) storing, using a computer system, the unique address number only once for the customers' address information such that the unique address number is extractable each time the customer's address information is input from a customer terminal.

12. The computing system of claim 11, wherein the customer address DB stores only the unique address numbers.

* * * * *